United States Patent
Bauchot et al.

(10) Patent No.: US 6,592,626 B1
(45) Date of Patent: Jul. 15, 2003

(54) METHOD AND SYSTEM IN AN ELECTRONIC SPREADSHEET FOR PROCESSING DIFFERENT CELL PROTECTION MODES

(75) Inventors: Frédéric Bauchot, St. Jeannet (FR); Albert Harari, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,452

(22) Filed: Sep. 20, 1999

(30) Foreign Application Priority Data

Mar. 5, 1999 (EP) .............................. 99480009

(51) Int. Cl.[7] .............................................. G06F 15/62
(52) U.S. Cl. ...................................... 715/503; 715/511
(58) Field of Search ................................. 707/503, 504, 707/530, 511, 539; 715/503, 504, 530, 511, 539

(56) References Cited

U.S. PATENT DOCUMENTS

| 5,095,429 | A | | 3/1992 | Harris et al. ................. 364/408 |
| 5,255,356 | A | * | 10/1993 | Michelman et al. ......... 707/504 |
| 5,303,146 | A | | 4/1994 | Ammirato et al. .......... 364/401 |
| 5,359,729 | A | * | 10/1994 | Yarnell et al. ................. 707/2 |
| 5,371,675 | A | | 12/1994 | Greif et al. ............... 364/419.1 |
| 5,937,416 | A | * | 8/1999 | Menzel ......................... 707/512 |
| 6,108,668 | A | * | 8/2000 | Bates et al. ................. 707/203 |
| 6,292,810 | B1 | * | 9/2001 | Richards ....................... 707/503 |

OTHER PUBLICATIONS

Chester, Thomas and Alden, Richard, "Mastering Excel 97, 4th edition," 1997.*

* cited by examiner

Primary Examiner—Heather R. Herndon
Assistant Examiner—Jonathan D Stone
(74) Attorney, Agent, or Firm—Bracewell & Patterson, LLP; Carlos Munoz-Bustamante

(57) ABSTRACT

The present invention relates to the field of information processing by digital computers and, more particularly, to a method and system, in an electronic spreadsheet, for easily swapping the protection mode of a cell between a protected mode and an unprotected mode, while preserving the mathematical formulas used in the protected mode The electronic spreadsheet includes a cell content manager with an interface for handling the content of user specified cells according to the read-only, protected mode where a cell is usually filled by a formula, and the read-write, unprotected mode with a free update of the cell by the spreadsheet user. Preferred display methodology is also described for representing the current mode of a given cell.

18 Claims, 7 Drawing Sheets

| Cell ID | Cell Mode | Cell Safe Content |
|---|---|---|
| 311 | 312 | 313 |

METHOD AND SYSTEM IN AN ELECTRONIC SPREADSHEET FOR PROCESSING DIFFERENT CELL PROTECTION MODES

TECHNICAL FIELD OF THE INVENTION

The present invention relates to the field of information processing by digital computers, more particularly to a method and system, in an electronic spreadsheet, for processing different cell protection modes, and easily swapping between a read-only mode and a read-write mode, while preserving the mathematical formulas used in the protected mode.

BACKGROUND ART

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-lefthand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsbomeIMcGraw-Mll, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Formulas used to automate the computations in a spreadsheet can be quite complex and hence difficult to tune and update. It is therefore common to protect cells containing complex formulas so that the user cannot modify them both intentionally or inadvertently. For this purpose, most today available spreadsheets propose a protection mode that can be either globally set (the file is "sealed") or locally set (a range of cells is "protected") to prevent the update of all cells or a only collection of these cells. This means meets perfectly the requirement of preventing modification of a given number of cells within a spreadsheet. Nonetheless, in some circumstances, the spreadsheet user may want on purpose to specify his own cell content instead of the one automatically computed by the formula. This can be done by not protecting the cell, so that it can be freely updated by the user. The problem then arises if afterwards, the spreadsheet user wishes to resume the automated formula. As the cell has been first turned to read-write mode, and then overwritten by the user entry, the formula is lost.

For example, it is possible to distinghish two different kind of people handling a spreadsheet : "developers" and "users". It is assumed here that the spreadsheet is rather complex, so that thanks to a custom template structure and content, the spreadsheet can be seen as a custom tool addressing a specific set of functional requirements. Such a template or model can be later on customized to the specificity's of a given case.

The first people, who can be called "developers", are the people who effectively build the spreadsheet template according to the set of functional requirements. Usually, these people are fluent with some "internals" of the spreadsheet tools such as script or macro languages, so that they know how to use built-in functions or custom functions to construct complex structures and formulas. During its development, the spreadsheet is left unsealed because the developer must have the possibility to modify the content or attributes of any range within the spreadsheet. When the spreadsheet development is over, the resulting spreadsheet template is sealed to protect its structure and content.

The second people, who can be called "users", are in fact filling the sealed spreadsheet template with their own data corresponding to a specific case. Such users are not usually fluent with the internal of the spreadsheet tools, and they only need to understand how to use the spreadsheet template. Clearly they do not need to master spreadsheet development tools like macro languages or formulas. When the user is filling the spreadsheet template, he should only access the ranges designed as data entry cells and which are normally unprotected. Other fields that derive from data entry cells are normally protected to avoid to get corrupted, as they may be filled with complex formulas.

The present invention proposes a cell content management for such last cells so that the user can, if required, change them with his own data, and later on return to the default value with built-in protected formula

SUMMARY OF THE INVENTION

The object of the present invention is to easily swap between a read-only protected mode and a read-write unprotected mode, while preserving the (maybe complex) formula used when a cell is in the protected mode.

More particularly, the present invention is directed to a method and system for processing different protection modes in a spreadsheet model comprising one or a plurality of cells containing information, the information including data values or formulas. The method comprises the steps of:
  enabling one or a plurality of cells within the spreadsheet model in response to an user input for swapping between:
    a safe mode or read only mode wherein the current content of the one or a plurality of cells is protected and cannot be modified (in this mode, the cell usually contains a complex formula aimed to automate some complex computation), and
    a free mode or read-write mode wherein the current content of said one or plurality of cells is not protected and can be modified;
  maintaining in a table the content of the enabled one or plurality of cells in the safe mode when the enabled one or plurality of cells is turned from the safe mode into the free mode;
  swapping the enabled one or plurality of cells between the free mode and the safe mode;
  replacing the current content of the enabled one or plurality of cells when the enabled one or plurality of cells is turned from the free mode into the safe mode, by the content of the enabled one or plurality of cells in the safe mode maintained in the table.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENTS

System Hardware

Figure 1A:
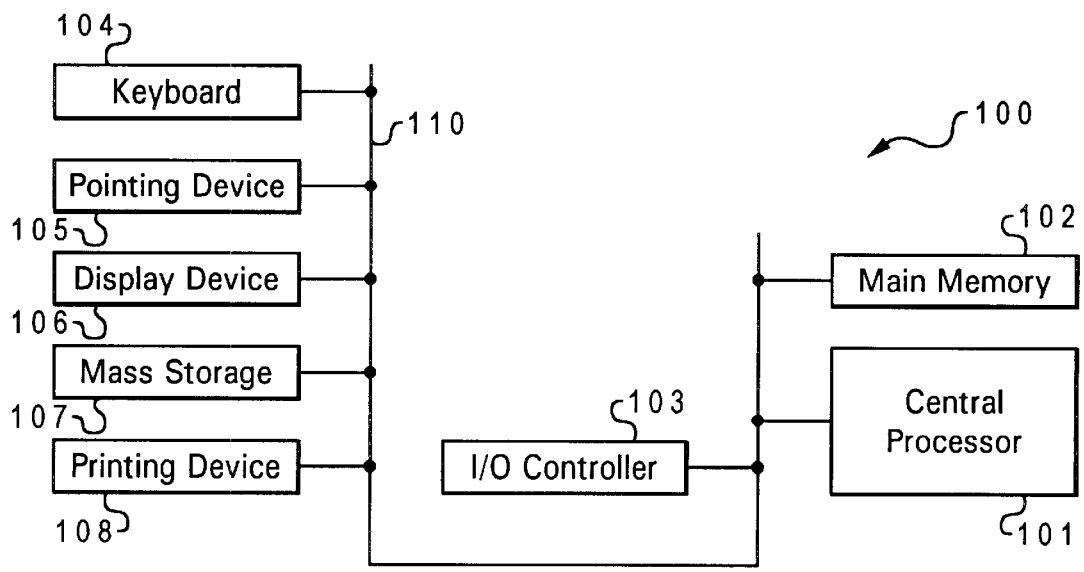
FIG. 1A is a block diagram of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

Figure 1B:
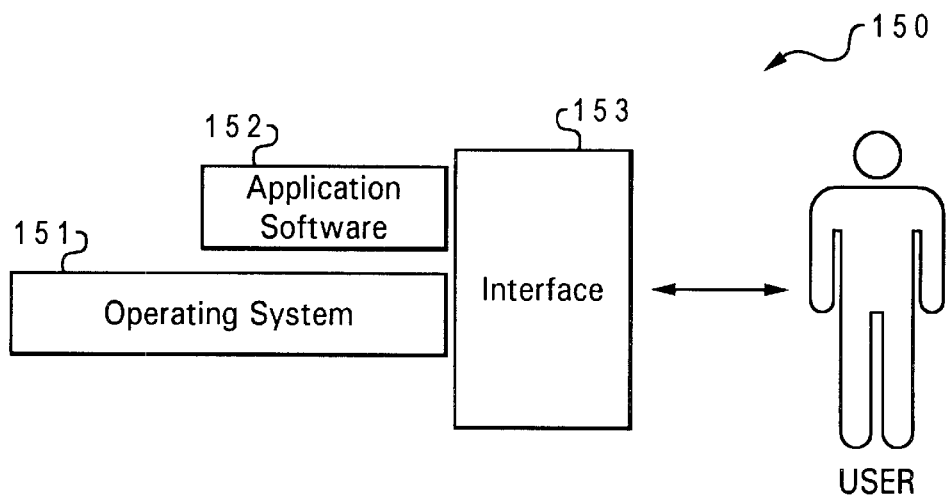
FIG. 1B is a block diagram of a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
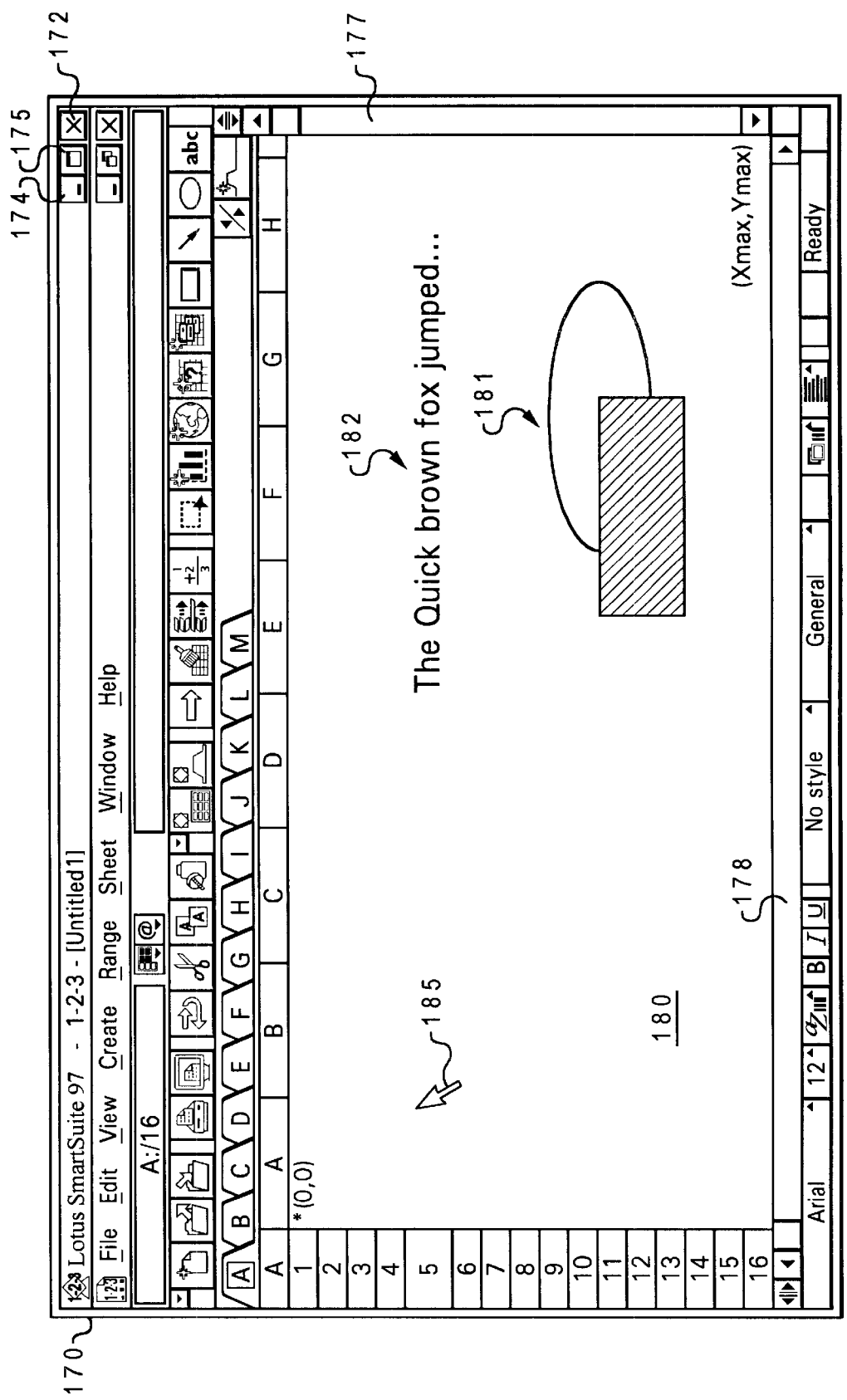
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figure 2A:
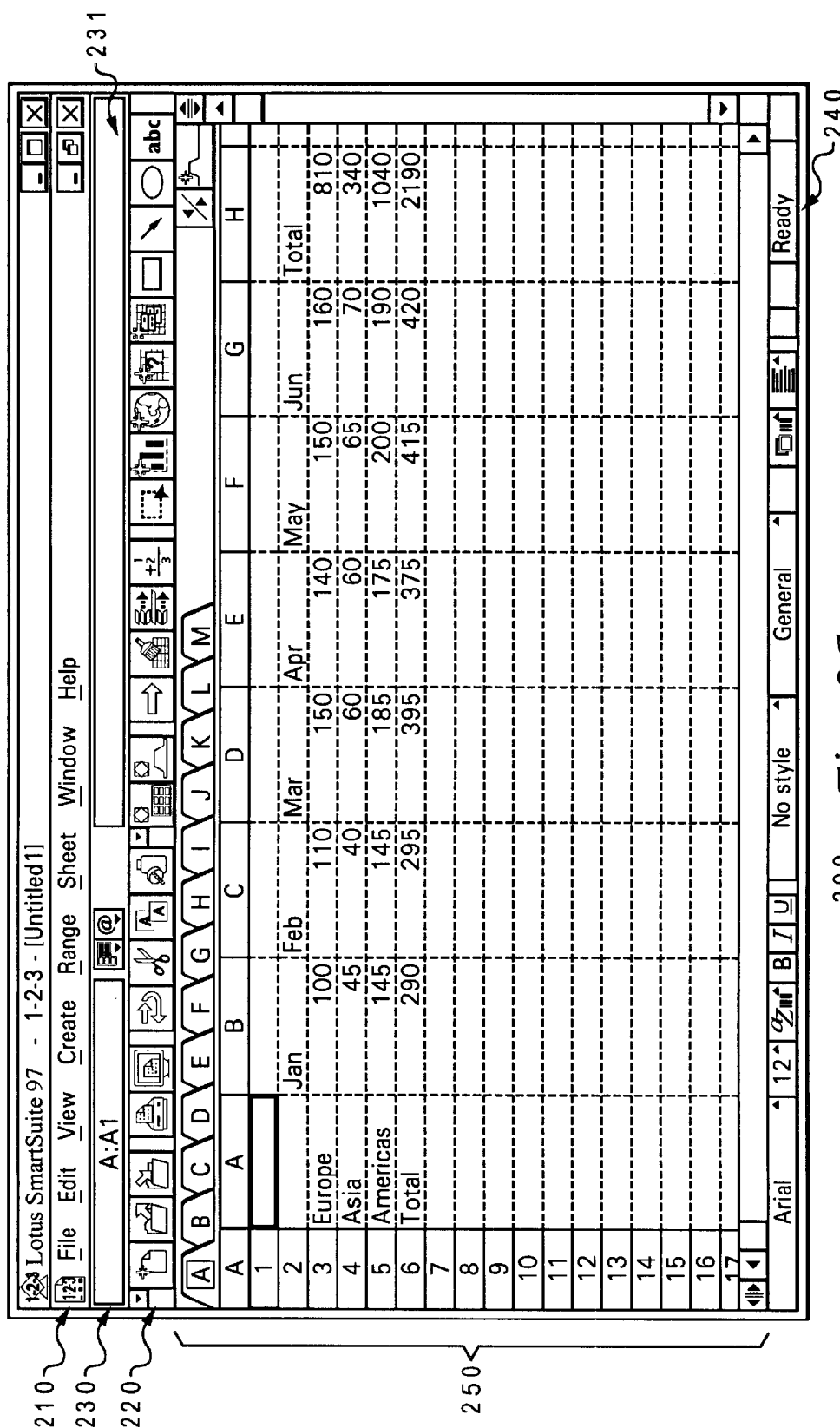
FIG. 2A shows a spreadsheet notebook interface used in the preferred embodiment of the present invention.

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window. 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

Figure 2B:
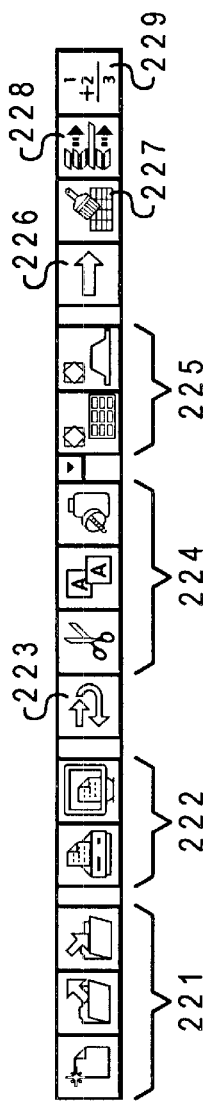
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a range selection button 226, a style copy button 227, a column resizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, resizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/colunm intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
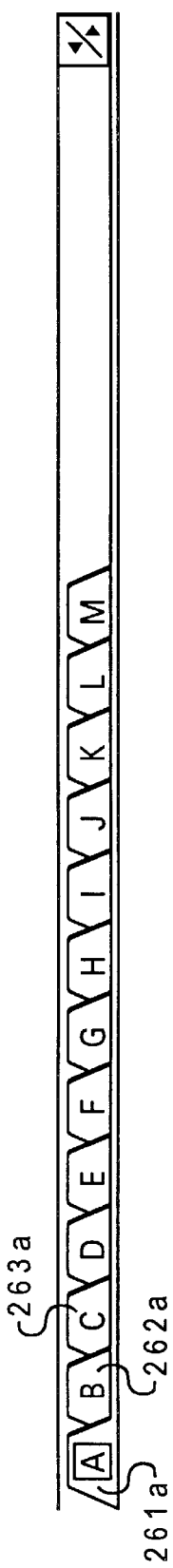
FIGS. 2C and 2D show page identifiers for rapidly accessing and manipulating individual pages of the notebook interface shown in FIG. 2A.
Figures 2D, 3:
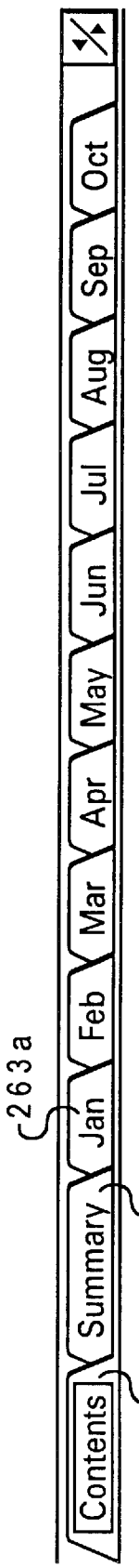
FIG. 3 illustrates the structure of the swap table used in the preferred embodiment of the present invention.

As shown in FIGS. 2C–D, individual notebook pages are identified by page identifiers 260, preferably located along one edge of a notebook. In a preferred embodiment, each page identifier is in the form of a tab member (e.g., members 261*a*, 262*a*, 263*a*) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261*a*, 262*a*, 263*a*) are respectively set to A, B, and C. Tab members are typically given descriptive names provided by the user, however. As shown in FIG. 2D, for example, the first three tab members have now been set to "Contents" (tab member 261*b*), "Summary" (tab member 262*b*), and "Jan" (tab member 263*b*). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet formulas. For example, when entering a formula referring to cells on another page, the user may simply use the descriptive page name in the formula itself (as described herein below), thus making it easier for the user to understand the relationship of the cell(s) or information being referenced.

A general description of the features and operation of the spreadsheet notebook interface may be found in Quattro Pro for Windows (Getting Started, User's Guide and Building Spreadsheet Applications), available from Borland International.

Management of Cells

A. Introduction

As the power of spreadsheet environments has increased since several years, it is today possible to develop complex custom applications solely based on spreadsheets, as opposed to applications developed with general purpose programming languages like C++ or VisualBasic from Microsoft Corporation. This can be achieved thanks to the spreadsheet imbedded tools such as macro languages, script languages and formulas. The development of such complex spreadsheet based applications is commonly assured by people (the "developers") having a solid background both in software engineering and in spreadsheet specificities. Spreadsheet users do not need to know all the details of spreadsheet engineering. They only have to know the basics of any spreadsheet (e.g. how to move between sheets, how to scroll within a sheet, how to enter a data within a cell), and also the specifics of their favourite spreadsheet based applications (e.g. where to specify a given information, where to get an interesting partial or final result).

Thanks to the power of spreadsheet development platforms, the developer can advantageously use in a given cell a complex formula to obtain some information (the "output") on the basis of several data specified by the user within a set of data entry cells (the "input"). Such a result, which is fully automated by the formula built in the spreadsheet application, corresponds to the default relationship between the input values and the output value: output= formula_of (inputs)

As such a relationship can be difficult to translate with formula statement, it is a common practice to protect the corresponding cell. Doing so, the spreadsheet application user has no risk for inadvertently corrupting the formula. In some specific situations, the spreadsheet application user may choose on purpose not to apply such a default relationship. For example, if the spreadsheet application builds an invoice form for a set of products or/and services, some unique terms and conditions specified within the contract between the provider and a customer may prevent to use a formula for determining the regular price of a given element within the invoice. To do this, the user must first unseal the spreadsheet so that the cell containing the formula can be overwritten by the customer specific data. This can be done only if the user knows how to unseal the spreadsheet and what is the associated spreadsheet password. It also presents the disadvantage of having the spreadsheet unsealed for a while, so that it can be inadvertently corrupted. If afterwards the user wishes to resume to the default built-in formula, the problem is even more difficult as the user is a priori not aware of the corresponding formula. In short it clearly appears from the previous example that conventional spreadsheets tools and means do not provide an adequate answer for swapping between a mode where a given cell is read-only, user protected, and another mode where this same cell is read-write enabled. The present invention offers a user-friendly solution to this problem.

B. Improved Cell Content Manager

In contrast to just-described conventional tools, the present invention provides a more powerful, user-friendly and interactive approach for managing the content of cells in a form of a cell content manager. The manager automatically allows the spreadsheet user to swap between two modes for a given cell when the spreadsheet is sealed.

In the first mode the target cell is protected and filled with a given data (for instance a complex formula), and in the second mode the spreadsheet user can freely update this same cell.

For more clarity, cells which can take advantage of the present invention will be called "swappable" cells.

C. Swappable Cells

In a preferred embodiment, swappable cells can be easily identified on the display device 106 within the work area 180 of the window 160 by using some specific cell attributes, such as a font style or font colour or background colour, etc. Furthermore such a cell attribute can advantageously be used to reflect the current mode (free or safe) of the swappable cell. In a preferred embodiment, the background colour of the swappable cell is set to a dark pink colour when the swappable cell is in the free mode while it is set to a light pink colour when the swappable cell is in the safe mode.

In a preferred embodiment, the present invention can is used in two steps:

The first step occurs during the development of the spreadsheet based application, when the developer has to decide, based on some criteria not developed here, whether a given cell or set of cells deserve to take advantage of the cell content manager or not.

If it is the case, the developer first selects the relevant cell by using the pointing device 105 or the keyboard 104 and then invokes a specific command called "Enable_Swap" thanks to conventional means available in spreadsheet environment, such as (but not limited to) dedicated push-buttons, keyboard entry short cuts, menu or submenu entries. At completion of the Enable_Swap command, the selected cell background colour is set to light pink, reflecting that the cell has been turned into a swappable cell, with the free default mode.

Inversely, the developer may decide to turn a swappable cell into a "normal" one. For this purpose, the same scenario is followed, so that the Enable_Swap command can undo what was performed during its last invocation.

During this step, it is clearly assumed that the spreadsheet application under construction is unsealed.

The second step occurs when the spreadsheet based application (whose development is complete) is effectively used by a user who chooses to swap a swappable cell from the free to the safe mode or inversely from the safe to the free mode. Whether the relevant cell is in the free mode or in the safe mode, the same scenario is followed by the user of the spreadsheet based application.

The user first selects the relevant cell by using the pointing device 105 or the keyboard 104 and then invokes a specific command called "Swap" thanks to conventional means available in spreadsheet environment, such as (but not limited to) dedicated push-buttons, keyboard entry short cuts, menu or submenu entries. At completion of the Swap command, the selected cell background colour is changed from light pink to dark pink, or from dark pink to light pink, depending on its initial setting.

If the current cell mode has been changed from safe to free, the cell content is replaced by its value and becomes unprotected, so that the user can freely update it with his own data.

If the current cell mode has been changed from free to safe, the cell content is set to the original one (typically the formula found when the spreadsheet based application was originally loaded before any modification), and the cell becomes protected to prevent any corruption of its content.

During this step, it is clearly assumed that the spreadsheet application under construction is sealed.

D. Swap Table

The decision to turn a given cell or group of cells into swappable cell(s) belong to the spreadsheet application developer. The decision to swap a swappable cell between the two modes safe and free belongs to the spreadsheet user. In both cases, a common repository, called "swap table", is used. This swap table is preferably saved on a non volatile memory (typically but not necessary as part of the spreadsheet disk file on the mass storage 107)

Referring now to FIG. 3A, the swap table 300 corresponds to a logical simple structure made of several records 310, each of them associated with a swappable cell. Each record includes three fields:

The "Cell ID" 311 field is used for identifying uniquely each cell of the spreadsheet. For instance, the Cell ID can correspond to the conventional address structure Sheet:RowColumn associated to every cell (For example D:E10 with D Sheet name, E Row name/number, 10 Column name/number)

The "Cell Mode" field 312 records the cell current mode, either safe or free.

The "Cell Safe Content" field 313 records the cell content in safe mode.

In the preferred embodiment, the swap table is explicitly included within the spreadsheet file itself, but other obvious implementations can instead rely on implicit information. Just as example of implicit information, the Cell Mode field information can be recorded with cell attributes such as font, colour, background colour, etc.

E. Developer Method

Figure 4:
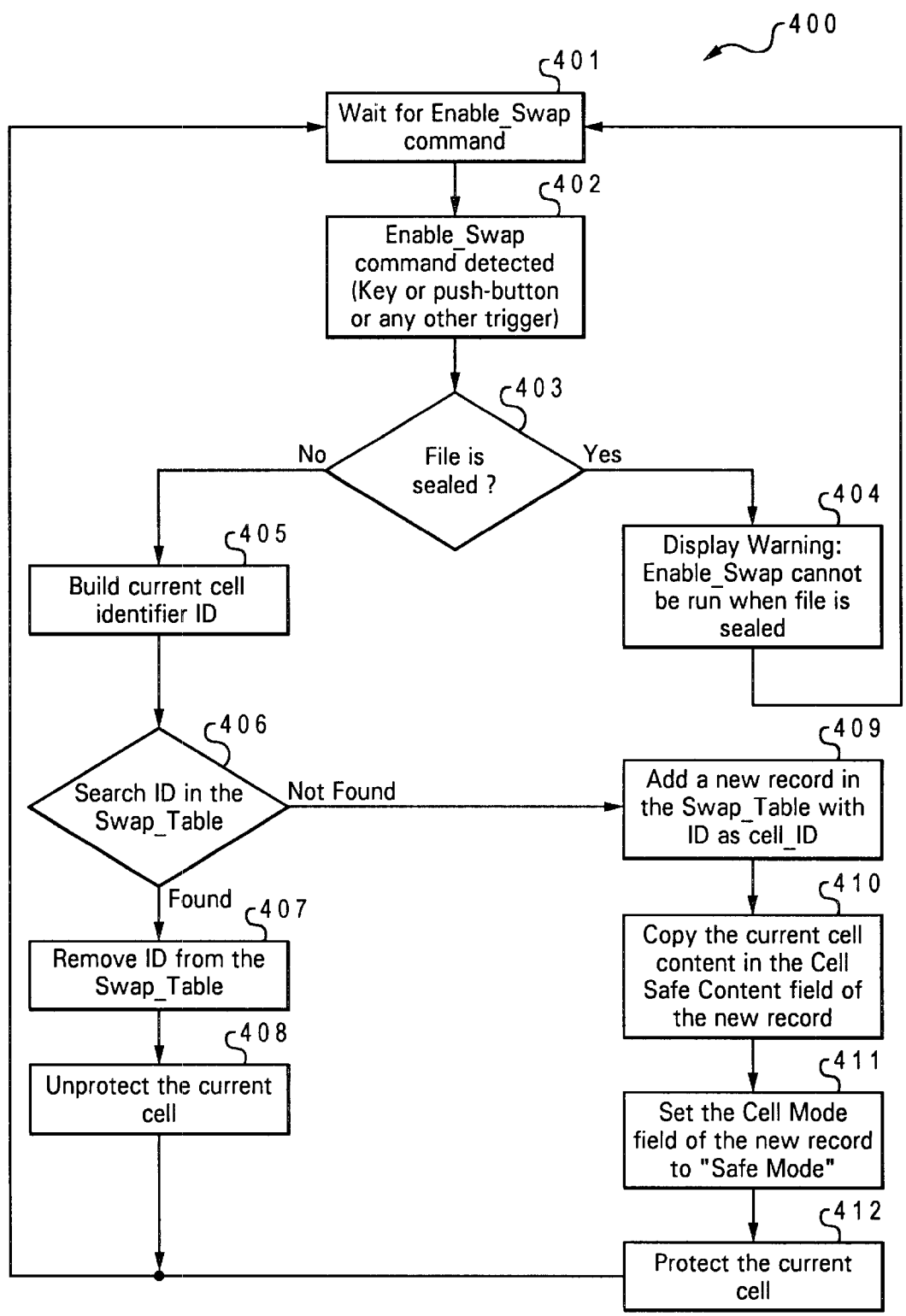
FIG. 4 is a flow chart illustrating the preferred method for enabling or disabling a given cell to take advantage of the present invention.

The method for enabling or disabling a given cell to take advantage of the present invention is summarized in flowchart 400 of FIG. 4. This method can be seen as the processing of an "Enable_Swap" command. As it has already been mentioned, in this first method, the person who interacts with the spreadsheet is the "developer". The method comprises the following steps At step 401, the method is in its default state, waiting for an event to initiate the process.

At step 402, an event is detected, as a result of a developer action. This action can be for instance a specific combination of key on the keyboard 104, or the click of the pointing device 105 on a specific button, or any other similar means not further specified here.

At step 403, a test determines whether the spreadsheet is currently sealed or not. If current spreadsheet is sealed, then step 404 follows. Otherwise, if current spreadsheet is not sealed, control is given to step 405.

Step 404 (the current spreadsheet is sealed) corresponds to an "escape" routine where the developer is notified by adequate means such as (but not limited to) a pop-up window displayed on the display device 106, that the Enable_Swap command is not available when the spreadsheet is sealed.

At step 405 (the current spreadsheet is not sealed) an identifier "ID" is assigned to the current cell. As previously suggested, this identifier can take the form of a conventional address used in spreadsheet.

At step 406, the Swap_Table 300 is visited to determine whether it contains or not a record of the form 310 with a Cell ID field 311 corresponding to the identifier "ID" previously assigned to the current cell in step 405.

If it is the case, that means that the current cell is swappable (was already enable for the present invention). Steps 407 and 408 turn the current cell disabled for the present invention.

At step 407, the whole record 310 with Cell ID field 311 corresponding to the identifier ID of the current cell, as determined at step 405, is removed from the Swap_Table 300. During this operation, the three fields 311, 312 and 313 of the same record 310 are removed from the Swap_Table 300.

At step 408, the current cell is turn unprotected (it is assumed that this correspond to the cell default status). This step can be easily modified in another embodiment of the present invention to cope with other rules regarding default cell status.

If it is not the case, that means that the current cell is not swappable (was already disabled for the present invention). Steps 409 to 412 turn the current cell swappable (enabled for the present invention).

At step 409, a new record 310 is added to the Swap_Table 300. Within this record, the Cell ID field 311 is initialized to the value of the identifier ID, as determined at step 405.

At step 410, the Cell Safe Content field 313 of the new record 310 in the Swap_Table 300 is initialized to the content found within the current cell. The content can be either a specific value or a formula. Such a formula can be very complex, as outlined in the following example taken from one implementation of a preferred embodiment:

@IF($CTYEARS<5;0;((+$Cost:H11/+$AB11)+
($Cost:N11/+$AD11)+($Cost:A F11/+$AG11)+
($Cost:AL11/+$AH11)+($Cost:T11/+$AE11)+
($Cost:AX11/+$ AJ11)+($Cost:AR11/+$AI11)+
($Cost:BD11/+$AK11)))

At step 411, the Cell Mode field 312 of the new record 310 in the Swap_Table 300 is initialized to the default value "Safe Mode".

At step 412, the current cell is turned protected, as it is consistent with the setting performed at step 411. After either step 408 or 412, control is given back to step 401 corresponding to the default wait state for any new Enable_Swap command.

F. User Method

Figure 5:
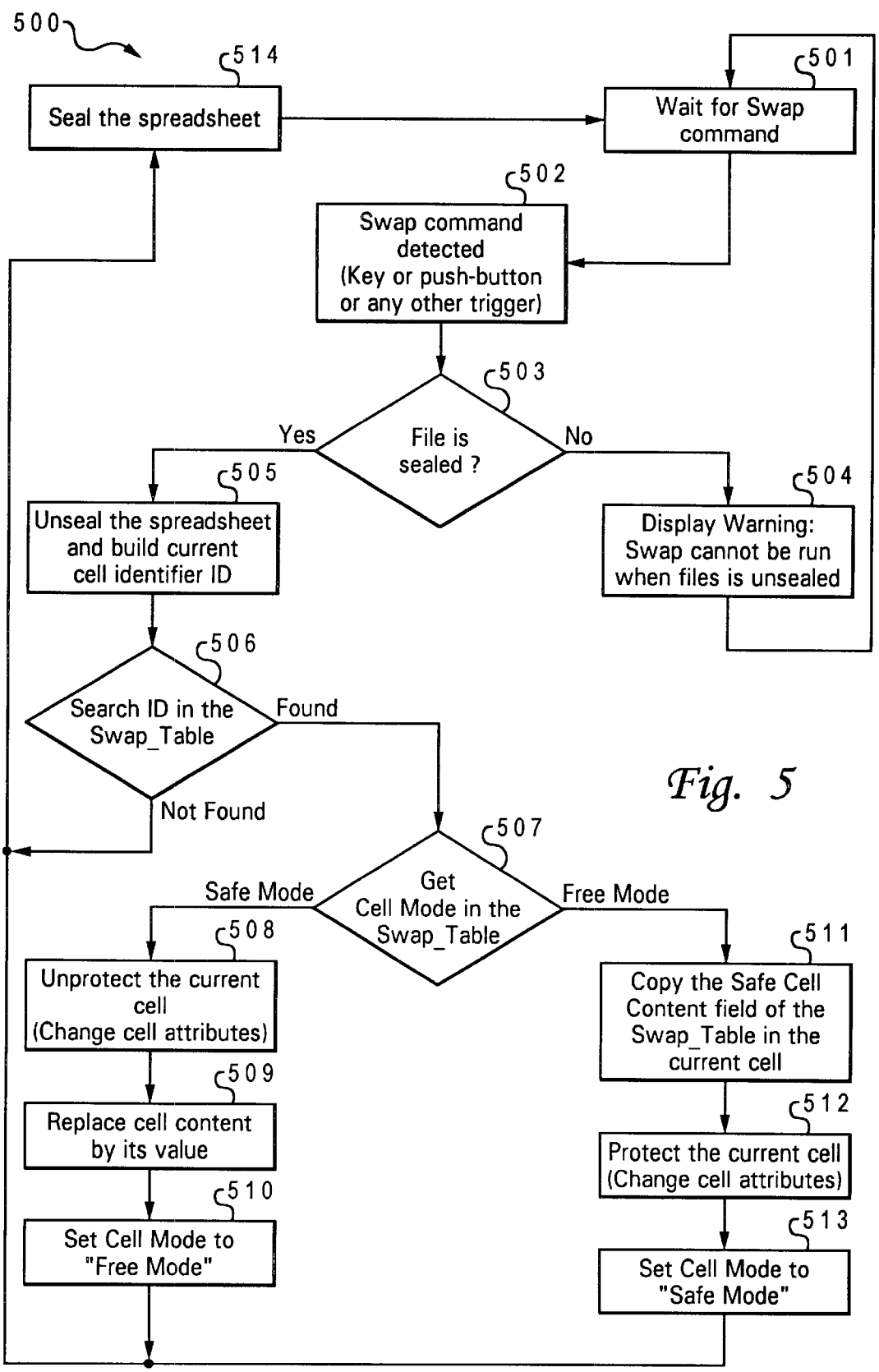
FIG. 5 is a flow chart illustrating the preferred method for swapping between the two "free" and "safe" modes according to the present invention.

The method according to the present invention for swapping a so-called "swappable" cell between the free mode and the safe mode is summarized in flowchart 500 of FIG. 5. This method can be seen as the processing of a "Swap" command. As it has already been mentioned, for this second method, the person who interacts with the spreadsheet is the "user". The method comprises the following steps:

At step 501, the method is in its default state, waiting for an event to initiate the following process.

At step 502, the event is detected, as a result of a developer action that can be for instance a specific combination of key on the keyboard 104, or the click of the pointing device 105 on a specific button, or any other similar means not further specified here.

At step 503, the method tests whether the spreadsheet is currently sealed or not.

If the current spreadsheet is not sealed then step 504 follows. It corresponds to an "escape" routine where the user is notified by adequate means such as (but not limited to) a pop-up window displayed on the display device 106, that the Swap command is not available when the spreadsheet is not sealed.

Otherwise, if the current spreadsheet is sealed, control is given to step 505 where the spreadsheet is first unsealed and where an identifier "ID" is assigned to the current cell. As previously suggested, this identifier can take the form of a conventional address used in spreadsheet.

At step 506, the Swap_Table 300 is visited to determine whether it contains or not a record of the form 310 with a Cell ID field 311 corresponding to the ID of the current cell, as assigned in previous step 505.

If it is not the case, that means that the current cell is not swappable, so that the Swap command has no effect on it. In this situation control is given to step 514 described later on.

If it is the case, that means that the current cell is swappable, and the next step is 507.

At step 507, the Cell Mode field 312 in record 310 with a Cell ID field 311 corresponding to the identifier ID previously assigned at step 505, is tested against the two possible values "Free Mode" and "Safe Mode".

If "Safe Mode" is found, the current cell is swapped to "Free Mode" in steps 508 to 510.

If "Free Mode" is found, the current cell is swapped to "Safe Mode" in steps 511 to 513.

At step 508, the current.cell is turned unprotected. Right after this operation, the current cell attributes can be advantageously changed to reflect the mode swap. In a preferred embodiment of the present invention, a cell turned into "Free Mode" receives a dark background colour. Any other similar cell attribute (such as font, style, border) can also be updated to reflect the mode swap.

At step 509, the cell content is replaced by its value. In the case where the current cell was filled by a formula, the content of the cell is replaced by the value taken by this formula. Such a formula can be very complex, as outlined in the following example taken from one implementation of a preferred embodiment:

@IF($CTYEARS<5;0;((+$Cost:H11/+$AB11)+
($Cost:N11/+$AD11)+($Cost:A F11/+$AG11)+
($Cost:AL11/+$AH11)+($Cost:T11/+$AE11)+
($Cost:AX11/+$ AJ11)+($Cost:AR11/+$AI11)+
($Cost:BD11/+$AK11)))

At step 510, the Cell Mode-field 312 of record 310 with Cell ID field 311 corresponding to the identifier ID assigned at step 505 is set to "Free Mode".

At step 511, the current cell content is filled with the Safe Cell Content field 313 of the record 310 with Cell ID field 311 corresponding to the identifier ID assigned at step 505.

At step 512, the current cell is turned protected. Just before this protection operation, the current cell attributes can be advantageously changed to reflect the mode swap. In a preferred embodiment of the present invention, a cell turned into "Safe Mode" receives a light background colour. Any other similar cell attribute (such as font, style, border) can also be updated to reflect the mode swap.

At step 513, the Cell mode field 312 of the record 310 -with Cell ID field 311 corresponding to the identifier ID assigned at step 505 is set to "Safe Mode".

At step 514, the spreadsheet is sealed and then control is given back to step 501 corresponding to the default wait state for any new Swap command.

Alternate Embodiments

While the invention has been particularly shown and described with reference to a preferred embodiment, it will be understood that various changes in form and detail may be made therein without departing from the spirit, and scope of the invention.

For instance, the cell management method and system according to the present invention may be used advantageously in those situations where it is desirable to manage the content of a range made of several cells as opposed to single cell ranges.

An improvement of the present invention would consist in preserving the content of a swappable cell when the content is turned from the safe mode into the free mode. Doing so, the skilled "user" has the possibility to modify the cell content-(which can typically be complex formulas) so that some level of automation is preserved. Referring to the user method previously described, the improvement simply consists in bypassing the step 509 in the "safe to free" scenario, while maintaining unchanged the "free to safe" scenario.

In the preferred embodiment of this invention, the spreadsheet model or template is assumed to be sealed to prevent users to inadvertently corrupt the spreadsheet. However, in another embodiment, the whole spreadsheet can remain unsealed whether the spreadsheet is used by a "developer" or a "user". In such a case the benefit of the present invention remains valid as the "user" can still recover the content of a cell (typically a complex formula) after having edited it on purpose.

What is claimed is:

1. A method within a data processing system for manipulating cell contents of a protected cell in a spreadsheet file having a plurality of standard cells, said method comprising:

enabling a developer to convert at least one standard cell of said spreadsheet file to a swappable cell only when said spreadsheet file is not sealed, wherein said swappable cell includes a safe mode in which cell contents are protected from modification and a free mode in which cell contents are not protected from modification;

in response to a request by said developer to convert said at least one standard cell to a swappable cell:
adding an entry in a swap table;
copying cell contents of said swappable cell to said entry; and
setting said swappable cell to said safe mode;

enabling a user to toggle said swappable cell between said safe mode and said free mode only when said spreadsheet file is sealed;

in response to a request by said user to toggle said swappable cell from said safe mode to said free mode:
replacing cell contents of said swappable cell with a value; and
setting said swappable cell to said free mode; and in response to a request by said user to toggle said swappable cell from said free mode to said safe mode:
copying contents of said entry from said swap table to said swappable cell; and
setting said swappable cell to said safe mode, such that said user can temporarily modify contents of a protected cell.

2. The method according to claim 1 further comprising retaining said cell contents of said swappable cell when said swappable cell is swapped from said safe mode into said free mode.

3. The method according to claim 1, wherein said in response to a request by said developer to convert said at least one standard cell to a swappable cell further includes determining whether or not said at least one standard cell has an entry within said swap table.

4. The method according to claim 1, wherein said in response to a request by said user to toggle said swappable cell from said safe mode to said free mode further includes protecting said swappable cell.

5. The method according to claim 1, wherein said in response to a request by said user to toggle said swappable cell from said free mode to said safe mode further includes unprotecting said swappable cell.

6. The method according to claim 1, wherein said swap table comprises an entry for each swappable cell, wherein said entry includes a safe content field for storing cell contents of a swappable cell, an identifier field for storing a cell identifier of said swappable cell for, and a mode field for storing indicating whether said swappable cell is in said safe mode or said free mode.

7. A data processing system that supports different protection modes in a spreadsheet having a plurality of standard cells, said data processing system comprising:

means for enabling a developer to convert at least one standard cell of said spreadsheet file to a swappable cell only when said spreadsheet file is not sealed, wherein said swappable cell includes a safe mode in which cell contents are protected from modification and a free mode in which cell contents are not protected from modification;

in response to a request by said developer to convert said at least one standard cell to a swappable cell:
   means for adding an entry in a swap table;
   means for copying cell contents of said swappable cell to said entry; and
   means for setting said swappable cell to said safe mode;
means for enabling a user to toggle said swappable cell between said safe mode and said free mode only when said spreadsheet file is sealed;
in response to a request by said user to toggle said swappable cell from said safe mode to said free mode:
   means for replacing cell contents of said swappable cell with a value; and
   means for setting said swappable cell to said free mode; and
in response to a request by said user to toggle said swappable cell from said free mode to said safe mode:
   means for copying contents of said entry from said swap table to said swappable cell; and
   means for setting said swappable cell to said safe mode,
such that said user can temporarily modify contents of a protected cell.

8. The data processing system according to claim 7, wherein said system further includes means for retaining said cell contents of said swappable cell when said swappable cell is swapped from said safe mode into said free mode.

9. The data processing system according to claim 7, wherein in response to a request by said developer to convert said at least one standard cell to a swappable cell further includes determining whether or not said at least one standard cell has an entry within said swap table.

10. The data processing system according to claim 7, wherein said cell enabler enables said at least one cell only while said spreadsheet is unsealed.

11. The data processing system according to claim 7, wherein said in response to a request by said user to toggle said swappable cell from said free mode to said safe mode further includes unprotecting said swappable cell.

12. The data processing system according to claim 7, wherein said swap table comprises an entry for each swappable cell, wherein said entry includes a safe content field for storing cell contents of a swappable cell, an identifier field for storing a cell identifier of said swappable cell for, and a mode field for storing indicating whether said swappable cell is in said safe mode or said free mode.

13. A program product for manipulating cell contents of a protected cell in a spreadsheet having a plurality of standard cells, said program product comprising:
   program code means for enabling a developer to convert at least one standard cell of said spreadsheet file to a swappable cell only when said spreadsheet file is not sealed, wherein said swappable cell includes a safe mode in which cell contents are protected from modification and a free mode in which cell contents are not protected from modification;
   in response to a request by said developer to convert said at least one standard cell to a swappable cell:
      program code means for adding an entry in a swap table;
      program code means for copying cell contents of said swappable cell to said entry; and
      program code means for setting said swappable cell to said safe mode;
   program code means for enabling a user to toggle said swappable cell between said safe mode and said free mode only when said spreadsheet file is sealed;
   in response to a request by said user to toggle said swappable cell from said safe mode to said free mode:
      program code means for replacing cell contents of said swappable cell with a value; and
      program code means for setting said swappable cell to said free mode; and
   in response to a request by said user to toggle said swappable cell from said free mode to said safe mode:
      program code means for copying contents of said entry from said swap table to said swappable cell; and
      program code means for setting said swappable cell to said safe mode,
such that said user can temporarily modify contents of a protected cell.

14. The program product according to claim 13, wherein said program product further includes program code means for retaining said cell contents of said swappable cell when said swappable cell is swapped from said safe mode into said free mode.

15. The program product according to claim 13, wherein said in response to a request by said developer to convert said at least one standard cell to a swappable cell further includes program code means for determining whether or not said at least one standard cell has an entry within said swap table.

16. The program product according to claim 13, wherein said in response to a request by said user to toggle said swappable cell from said safe mode to said free mode further includes program code means for protecting said swappable cell.

17. The program product according to claim 13, wherein said in response to a request by said user to toggle said swappable cell from said free mode to said safe mode further includes program code means for unprotecting said swappable cell.

18. The program product according to claim 13, wherein said swap table comprises an entry for each swappable cell, wherein said entry includes a safe content field for storing cell contents of a swappable cell, an identifier field for storing a cell identifier of said swappable cell for, and a mode field for storing indicating whether said swappable cell is in said safe mode or said free mode.

* * * * *